United States Patent [19]
Nishioka et al.

[11] Patent Number: 5,844,022
[45] Date of Patent: Dec. 1, 1998

[54] ADDITIVE FOR SYNTHETIC RESINS AND SYNTHETIC RESIN COMPOSITIONS

[75] Inventors: Hidehiko Nishioka; Minoru Hanazaki; Shiro Minayoshi; Shigeo Takiyama; Mitsunobu Aoyama, all of Hyogo, Japan

[73] Assignee: Maruo Calcium Company Limited, Hyogo, Japan

[21] Appl. No.: 983,291

[22] PCT Filed: Jul. 9, 1996

[86] PCT No.: PCT/JP96/01894

§ 371 Date: Jan. 12, 1998

§ 102(e) Date: Jan. 12, 1998

[87] PCT Pub. No.: WO97/03119

PCT Pub. Date: Jan. 30, 1997

[30] Foreign Application Priority Data

Jul. 12, 1995 [JP] Japan ..................................... 7-200504

[51] Int. Cl.⁶ .................................. C08J 9/32; B32B 5/16
[52] U.S. Cl. ........................... 523/218; 521/54; 428/403; 428/694 BA
[58] Field of Search .............................. 523/218; 428/403; 428/694 BA

[56] References Cited

FOREIGN PATENT DOCUMENTS 7-118011 9/1995 Japan .

*Primary Examiner*—Morton Foelak
*Attorney, Agent, or Firm*—Armstrong, Westerman, Hattori, McLeland & Naughton

[57] ABSTRACT

An additive for synthetic resins is provided. The additive comprises particles surface-coated with a petaloid porous hydroxyapatite having a chemical formula $Ca_5(PO_4)_3(OH)$ and the petaloid porous hydroxyapatite is not less than 5% by weight of the particles. The additive can be added to any kinds of synthetic resins. If the additive is used in a polyethylene film, blocking of the film is not only prevented, but good transparency and good anti-scratch ability are imparted, and if the additive is used in a polyester, a film having good slipperiness, anti-abrasion and less coarse protrusions can be provided.

11 Claims, 1 Drawing Sheet

ADDITIVE FOR SYNTHETIC RESINS AND SYNTHETIC RESIN COMPOSITIONS

TECHNICAL FIELD

The present invention relates to an additive for synthetic resins comprising particles that are surface-coated with a specific form of petaloid porous hydroxyapatite, and a synthetic resin composition containing the particles. The purpose of the present invention is to provide an additive that is used for synthetic resins such as polyolefin and polyester, and that can exhibit a superior preventing ability against blocking of, for example, a synthetic resin film, and a synthetic resin fiber, and a synthetic resin composition containing the additive.

BACKGROUND ART

Synthetic resins are widely used in various industrial fields. Among the synthetic resins, an industrially manufactured polyester, especially polyethyleneterephtalate (hereinafter referred to as PET) has superior physical and chemical features and is used as fibers, films, and other molded articles. For example, in a film area, the polyester is used for magnetic tapes such as audiotapes and videotapes, condensers, photographs, wrappings, OHP, pre-paid cards and so on.

Slipperiness and anti-shavingness of the polyester film are main features that control workability in a manufacturing step or a processing step of the film in various uses, and a quality of a product. In a case where a magnet layer is coated on a surface of the polyester film so as to use as a magnetic tape, if the slipperiness and anti-shavingness of the film are not sufficient, a friction between coating rolls and the surface of the film becomes large, thereby causing a severe abrasion of the surface of the film, and in an extreme case, resulting in wrinkles and scratches on the surface of the film. Even after processing the film into a tape such as audiotapes, videotapes and computer-tapes by slitting the film which is coated with the magnetic layer, an extreme friction between the surface of the film and many guides or a reproduction head will occur during operations such as drawing out of the tape from a reel or cassette, winding the tape and so on. This extreme friction causes scratches or strain, and the shaving of the surface of the polyester film deposits white powder, and results in a lack of magnetic recording signal, namely, drop-out.

For lowering a friction coefficient of the polyester, many methods for improving slipperiness of the surface of the molded articles are proposed by incorporating inorganic fine particles into polyester so as to give minute and appropriate roughness to the surface of the molded articles of the polyester. However, since affinity between the fine particles and the polyester is not sufficient, both transparency and anti-abrasion ability of the film are not satisfactory.

In case of a polyolefin, the polyolefin is widely used in various industrial fields. Especially, a polyolefin film such as a polypropylene film is the most widely used as various wrapping materials. Since it is known that such kind of the polyolefin film is adhesive, the polyolefin film tends to cause blocking. For this reason, workability in a process for manufacturing or processing of the film becomes worse. Furthermore, in a case where the film is used in packaging or wrapping, troubles such as less workability in opening the package or wrapping tend to occur. Therefore, in general, an anti-blocking treatment is done on this kind of film. As an anti-blocking agent, a finely powdered silicic acid, zeolite, calcium carbonate and kaolin cray are typically known and used.

On the other hand, the polyolefin film requires, as qualitative features, superior transparency and good anti-scratch ability (For example, the surface of the film is less scratched when the surface of the film is contacted with each other.). However, the transparency and the anti-scratch ability, are contrary to the anti-blocking ability. For example, in order to improve the anti-blocking ability of the polyolefin film, if a large amount of the blocking agent is used, the anti-scratch ability and the transparency become poorer as an amount of the blocking agent to be added is increased. Therefore, as the additive to improve the anti-blocking ability, the anti-scratch ability and the transparency of the film to a satisfactory level, the conventional inorganic powder was far from satisfaction.

In case of the conventional kaolin cray, since the particle shape of the kaolin cray has a plate-like structure, when the kaolin cray is used as a blocking agent of the polyolefin film, the kaolin cray can not form roughness on the surface of the polyolefin film in a satisfactory level. Therefore, a large amount of kaolin cray is required to obtain a satisfactory level of anti-blocking ability. As a result, only polyolefin film having insufficient transparency could have been obtained.

In case of the finely powdered silicic acid, since the main particles of the silicic acid is extremely minute, a polyolefin film with a satisfactory level of transparency and anti-scratch ability can be obtained. However, since the silicic acid cannot form roughness on the surface of the polyolefin film, a polyolefin film having a satisfactory level of anti-blocking ability could not have been obtained even though a large amount of silicic acid is used.

In case of the powdered zeolite, a polyolefin film that has good transparency and anti-blocking ability can be obtained when compared to a film containing the kaolin cray or the finely powdered silicic acid. However, a film with good anti-scratch ability cannnot be obtained. Moreover, since the zeolite is known to have crystalline water, the zeolite may cause defective products due to bubbling formed by the crystalline water which is released from the zeolite by heating in a process of molding a synthetic resin or making a film. If the zeolite is heated to remove the crystalline water (so called zeolite water) so as to make an activated zeolite which does not have crystalline water, the zeolite readsorbs water easily. Therefore, it is substantially impossible to remove an influence of the water in a process for film formation.

Furthermore, in case of the calcium carbonate, since the calcium carbonate does not have crystalline water, there is no bubbling due to a release of the crystalline water. However, since the calcium carbonate inherently has a strong aggregation tendency, the calcium carbonate tends to form secondary large particles which are formed by aggregation of many primary particles. Therefore, the calcium carbonate has problems to be solved as a good blocking agent for a polyolefin film with a good anti-blocking activity, transparency and anti-scratch ability.

In view of the above facts, after extensive and intensive studies on an additive for synthetic resins which can give a good anti-blocking ability, good transparency and good anti-scratch ability to synthetic resins represented by polyesters or polyolefins, especially a film or a fiber thereof and which has a good affinity to the synthetic resin, and further on a synthetic resin composition containing the additive, the present inventors have found out that particles having a specific particle composition, specific particle diameter and distribution thereof and specific surface have functions as the intended additive for synthetic resins, and that a synthetic resin composition containing this additive can attain the intended purpose, and thus accomplished the present invention.

DISCLOSURE OF INVENTION

The present invention is, in a first aspect, directed to an additive for synthetic resins which comprises particles which are surface-coated with petaloid porous hydroxyapatite having a chemical formula $Ca_5(PO_4)_3(OH)$, the petaloid porous hydroxyapatite being contained in the particles in a ratio of not less than 5% by weight, and the particles satisfying the following formulas (a)–(d):

$0.1 \leq dx1 \leq 20 (\mu m)$ (a)

$1 \leq \alpha \leq 2$, where $\alpha = d50/dx1$ (b)

$0 \leq \beta \leq 1.7$, where $\beta = (d90-d10)/d50$, and (c)

$40/dx1 \leq Sw1 \leq 400$ (d)

wherein,
- dx1: Average particle diameter ($\mu m$) measured by a photograph of an electron microscope;
- $\alpha$: Dispersion coefficient;
- d50: 50% average particle diameter ($\mu m$) measured by a particle size distribution tester using a microtrack FRA laser;
- $\beta$: Sharpness; a particle size distribution value; the smaller the value becomes, the sharper the distribution becomes;
- d90: 90% particle diameter of the total particles passed through a sieve measured by a particle size distribution tester using a microtrack FRA laser;
- d10: 10% particle diameter of the total particles passed through a sieve measured by a particle size distribution tester using a microtrack FRA laser;
- Sw1: BET specific surface $m^2/g$ by a nitrogen adsorbing method.

The present invention is, in a second aspect, directed to a synthetic resin composition which contains particles which are surface-coated with petaloid porous hydroxyapatite having a chemical formula $Ca_5(PO_4)_3(OH)$, the petaloid porous hydroxyapatite being contained in the particles in a ratio of not less than 5% by weight of the particles, and the particles satisfying the following formulas (a)–(d):

$0.1 \leq dx1 \leq 20 (\mu m)$ (a)

$1 \leq \alpha \leq 2$, where $\alpha = d50/dx1$ (b)

$0 \leq \beta \leq 1.7$, where $\beta = (d90-d10)/d50$, and (c)

$40/dx1 \leq Sw1 \leq 400$ (d)

wherein,
- dx1: Average particle diameter ($\mu m$) measured by a photograph of an electron microscope;
- $\alpha$: Dispersion coefficient;
- d50: 50% average particle diameter ($\mu m$) measured by a particle size distribution tester using a microtrack FRA laser;
- $\beta$: Sharpness; a particle size distribution value; the smaller the value becomes, the sharper the distribution becomes;
- d90: 90% particle diameter of the total particles passed through a sieve measured by a particle size distribution tester using a microtrack FRA laser,
- d10: 10% particle diameter of the total particles passed through a sieve measured by a particle size distribution tester using a microtrack FRA laser;
- Sw1: BET specific surface $m^2/g$ by a nitrogen adsorbing method.

BEST MODE FOR CARRYING OUT THE INVENTION

The most important feature of the additive for synthetic resins of the present invention and the synthetic resin composition containing the additive of the present invention is that the surface of the particle of the additive is coated with petaloid porous hydroxyapatite, not merely coated with hydroxyapatite.

The petaloid porous hydroxyapatite that covers the surface of the particle of the additive of the present invention has features that the petaloid structure has self-breakability. The self-breakability is defined as a characteristic which, when a stress is given from outside, the particle itself can absorb or disperse the stress by destroying or breaking and deforming a part of the particle, thereby decreasing a repulsive force from the particle against the stress from the outside. Therefore, for example, even in a case where the additive of the present invention is added to a synthetic resin film in a large amount and the thus obtained films are contacted with each other, since the particles of the petaloid structure which exist on the surface of the film can self-break down to thus largely decrease the stress caused by the contact of the films, the degree of abrasion of the surface of the film can be remarkably decreased as compared to a case where other additives for synthetic resins that do not have self-breakability are used. As a result, the synthetic resin film having a good anti-scratch ability can be obtained.

Moreover, since the additive of the present invention is comprised of porous hydroxyapatite of the petaloid structure having a large specific surface, many hydroxy groups exist on the surface. Therefore, the additive has a good affinity to synthetic resins such as polyesters and polyolefins so that it is possible to prepare a synthetic resin with a good transparency. Furthermore, when the additive of the present invention is used, for example, as a blocking agent of films and so on, it is possible to obtain a synthetic resin film from which dropping out of the additive particles is extremely lowered.

The petaloid structure of the surface of the additive for synthetic resins of the present invention does not have any limitations as far as the petaloid structure like a flower of rose can be observed on the surface of the additive by a SEM photograph observation. However, in order to obtain an additive with a sufficient self-breakability and a synthetic resin composition with a sufficient anti-scratch ability, it is preferable that dx2, $\omega 1$ and $\omega 2$ satisfy the followings: $0.01 \leq dx2 \leq 1 (\mu m)$, $90 \leq \omega 1 \leq 99$ and $60 \leq \omega 2 \leq 95$, more preferably, $0.01 \leq dx2 \leq 1 (\mu m)$, $95 \leq \omega 1 \leq 99$ and $70 \leq \omega 2 \leq 95$, and wherein, dx2, $\omega 1$ and $\omega 2$ represent the followings:
- dx2: an average micropore diameter ($\mu m$) of particles measured from a distribution of the micropore measured by a mercury penetration method;
- $\omega 1$: a static percentage of voids (%) calculated from the following equation (m):

$$\omega 1 = \left\{ 1 - \frac{1}{2.9 \times [\text{apparent specific volume}]} \right\} \times 100(\%) \quad (m)$$

wherein the apparent specific volume (ml/g) is measured according to a static method of pigment test of JIS K5101-91 20.1;

ω2: a pressurized percentage of voids (%) calculated from the following equation (n):

$$\omega 2 = \left\{ 1 - \frac{0.5}{2.9 \times 2 \times [\text{thickness}]} \right\} \times 100(\%) \quad (n)$$

wherein the thickness is measured by a slide calipers after packing 0.5 g of a sample in a cylinder having a section of 2 cm$^2$, pressurizing the sample with a pressure of 30 kg/cm$^2$ for 30 seconds.

A weight ratio of the petaloid porous hydroxyapatite of the additive particles for synthetic resins of the present invention is not less than 5% by weight. In view of a further increase in affinity between the particles of the additive and the synthetic resin and also in view of an increase of self-breakability, the ratio is preferably not less than 25% by weight, more preferably, not less than 50% by weight and still more preferably, not less than 90% by weight. The ratio of not less than 90% by weight and not more than 98% by weight is most preferable, since if the ratio is 100% by weight, it happens sometimes that the self-breakability becomes excess, which results in insufficient anti-blocking ability when the additive is used in a synthetic resin fiber, film and so on.

The dx1 of the additive for synthetic resins of the present invention is $0.1 \leq dx1 \leq 20(\mu m)$, preferably, $0.2 \leq dx1 \leq 10$ ($\mu m$), and more preferable, $0.5 \leq dx1 \leq 8(\mu m)$.

If dx1 is less than 0.1 $\mu m$, the dispersion of the additive in the synthetic resin is not easy, and furthermore, the sufficient anti-blocking ability can not be revealed when the additive is used in, for example, a synthetic resin fiber or film.

If dx1 is more than 20 $\mu m$, not only the transparency of the synthetic resin is damaged, but also there causes a tear of the fiber or coarse protrusions when used in, for example, a synthetic fiber resin or film. Thus, the dx1 more than 20 $\mu m$ is not preferable.

The α and β of the additive for synthetic resins of the present invention satisfy $1 \leq \alpha \leq 2$ and $1 \leq \beta \leq 1.7$, respectively, and preferably, $1 \leq \alpha \leq 1.5$ and $0 \leq \beta \leq 1$.

If α is more than 2, it is not preferable in view of a design of a performance of molded articles of synthetic resins. For example, in a field of film, since a size of concavo-convex of the surface of the film obtained by addition of such an additive becomes uneven, a film having a sufficient anti-blocking ability can not be obtained. Especially, in a field of magnetic tapes such as audiotapes and videotapes where higher physical properties are required, a value of α being not more than 1.5 is more preferable.

When β, which is a function of a particle size composition of the additive for synthetic resins, is over 1.7, a width of the particle size distribution becomes broad so that contents of unnecessary fine particles for synthetic resin compositions and coarse particles which cause coarse protrusions of the surface of the synthetic resin molded articles such as film become high. Therefore, the additive for synthetic resins that can give a sufficient anti-blocking ability and good transparency to the synthetic resin molded articles such as synthetic resin films can not be obtained.

The Sw1 of the additive for synthetic resins of the present invention satisfies $40/dx1 \leq Sw1 \leq 400$, preferably $100/dx1 \leq Sw1 \leq 350$.

In case where Sw1 is less than 40/dx1, affinity between the additive and the synthetic resin is not sufficient. Therefore, transparency of the synthetic resin can be damaged, and undesirable drop-out of the additive occurs when the additive is used in a film, fiber and so on. Furthermore, since the self-breakability of the additive is insufficient, a synthetic resin composition with a good anti-scratch ability can not be obtained.

In case where Sw1 is more than 400, the self-breakability of the additive becomes excess. Therefore, when used in a film or fiber and so on, the anti-scratch ability of the synthetic resin composition becomes good, but the synthetic resin composition with a good anti-blocking ability can not be obtained. Furthermore, for example, in a process for manufacturing a polyester, when the polyester is polymerized by suspending an additive having Sw1 of more than 400 into ethylene glycol (a raw material of polyester), since the additive has a large surface and high activity, the additive itself aggregates to form coarse particles in the polymerization process, or coarse organic particles can be formed by calcium ion generated from the additive itself, and thus it is undesirable.

As a substrate of the additive for synthetic resins of the present invention, both inorganic particles and organic particles can be used. As preferable particles, white pigments such as talc, kaolin, mica, calcium carbonate, magnesium carbonate, calcium hydroxide, magnesium hydroxide, calcium silicate, titanium oxide, barium sulfate, calcium phosphate and hydroxyapatite can be used. Among them, calcium carbonate is the most preferable.

The additive for synthetic resins of the present invention can be prepared in an aqueous solution in which the particles as a substrate is dispersed by gradually reacting a water-soluble calcium salt and a water-soluble phosphoric acid or a water soluble phosphate, thereby depositing petaloid porous hydroxyapatite on the surface of the particles as a substrate.

Using calcium carbonate as a substrate, the additive for synthetic resins can be prepared by mixing an aqueous suspension dispersion of calcium carbonate and a dilute aqueous solution of phosphoric acid and/or an aqueous suspension dispersion of calcium dihydrogen phosphate and/or calcium hydrogenphosphate.2H$_2$O at a specific ratio under specific mixing conditions, followed by aging under specific aging conditions and drying under specific drying conditions.

The following is a detailed description regarding the manufacture of the additive for synthetic resins of the present invention using calcium carbonate as a substrate.

An aqueous suspension dispersion of calcium carbonate with an average particle diameter of 0.1–5 $\mu m$ and a dilute aqueous solution of phosphoric acid and/or an aqueous suspension dispersion of calcium dihydrogen phosphate with an average particle diameter of 2–10 $\mu m$ and/or an aqueous suspension dispersion of calcium hydrogenphosphate.2H$_2$O with an average diameter of 2–10 $\mu m$ are mixed in water so that an atomic ratio of Ca/P becomes 33.53–1.72 under the following mixing conditions. The mixture is then aged under the following conditions followed by dehydration or without dehydration, drying under drying conditions at not higher than 700° C., and crushing. The average particle diameter was measured by a particle size distribution tester of SA-CP3 manufactured shimadzu Corp.

Mixing conditions

Solid concentration of the aqueous suspension dispersion of calcium carbonate: 1–15%;

Phosphoric acid concentration of the dilute aqueous solution: 1–50%;

Solid concentration of the aqueous suspension dispersion of calcium dihydrogen phosphate: 2–15%; p0 Solid concentration of the aqueous suspension dispersion of calcium hydrogenphosphate.2H$_2$O: 2–15%;

Mixing time: 0.1–150 hours;

Temperature of the aqueous suspension liquid: 0°–80° C.; and pH of a mixture of the aqueous suspension liquid: 5–9.

Aging conditions

Calcium concentration: 0.4–5%;

Aging time: 0.1–100 hours;

Temperature of the aqueous suspension liquid: 20°–80° C.; and pH of the aqueous suspension liquid: 6–9.

Synthetic resins and synthetic resin molded articles to which the additive for synthetic resins of the present invention are applicable are not specifically limited. As thermoplastic resins, polyethylene, polypropylene, polystyrene, polyvinyl acetate, polyacrylate, polyacrylamide, polyester, polyacrylonitrile, polyamide, polyvinyl chloride, polyvinylidene chloride and so on are exemplified.

As thermosetting resins, phenol resin, epoxy resin, unsaturated polyester resin, alkyd resin, urea resin, melamine resin, urethane resin, silicone resin and so on are exemplified. Among them, the additive of the present invention is especially applicable to a film composition and a fiber composition made from polyolefin or saturated polyester.

The polyolefin is not limited as far as the polyolefin has ability to form a transparent and crystalline self-supporting film. As the polyolefin, crystalline homopolymers of α-olefins having carbon number 2–12 or crystalline copolymers of two or more kinds thereof, are exemplified. For example, polyethylene, polypropylene, poly-4-methylpentene-1, ethylene-propylene random or block copolymers, ethylene-propylene-butene copolymers and ethylene-propylene-hexene copolymers are exemplified. Among them, polypropylene or copolymers of propylene containing 50% by weight or more of propylene and the other α-olefins is preferable. Especially, a propylene polymer containing 0–6% by weight of ethylene is preferable.

Those polyolefins are crystalline and have isotactic index (II) of 40 or more, preferably, 60 or more, and most preferably, 90 or more. Further, they are usable as far as they can be molded. Usually, polyolefins have preferably a melt flow rate (MFR) of 0.01–100 g/10 min., more preferably 0.1–50 g/10 min., most preferably 0.5–10 g/10 min.

As a polyester, there is no limitation as far as the polyester has aromatic dicarboxylic acid as its main acid component and aliphatic glycol as its main glycolic component. Such a polyester is substantially linear and has a film forming ability, especially, by melt molding.

As the aromatic dicarboxylic acid, for example, terephthalic acid, naphthalenedicaboxylic acid, isophthalic acid, diphenylethanedicarboxylic acid, diphenyldicarboxylic acid, diphenyletherdicarboxylic acid, diphenylsulfonedicarboxylic acid, diphenylketonedicarboxylic acid and anthracenedicarboxylic acid are exemplified.

As the aliphatic glycol, for example, polymethylene glycols having a carbon number of 2–10, such as ethylene glycol, trimethylene glycol, tetramethylene glycol, pentamethylene glycol, hexamethylene glycol and decamethylene glycol, or alicyclic diols such as cyclohexanedimethanol are exemplified.

In the present invention, polyesters having, for example, alkyleneterephthalate and/or alkylenenaphthalate as its main component are preferably used. Among such polyesters, not only polyethyleneterephthalate or polyethylene-2,6-naphthalate, but also copolymers comprising for example, 80 mol % or more of the total dicarboxylic acid component being terephthalic acid and/or 2,6-naphthalenedicaboxylic acid and 80 mol % or more of the total glycol component being ethylene glycol. In this case, 20 mol % or less of the total acid component can be above aromatic dicarboxylic acids excluding terephthalic acid and/or naphthalenedicarboxylic acid, aliphatic dicarboxylic acids such as adipic acid and sebacic acid, and alicyclic dicarboxylic acids such as cyclohexane-1,4-dicarboxylic acid. Also, 20 mol % or less of the total glycol component can be above glycols excluding ethylene glycol, aromatic diols such as hydroquinone and 2,2-bis(4-hydoxyphenyl) propane, aliphatic diols containing aromatics such as 1,4-dihydroxymethylbenzene, polyalkylene glycols (polyoxyalkylene glycols) such as polyethylene glycol, polypropylene glycol and polyteramethylene glycol, and so on.

Furthermore, the saturated polyester includes polymers in which an oxycarboxylic acid component derived from aromatic oxy acid such as hydroxybenzoic acid and aliphatic oxy acid such as ω-hydroxycaplic acid was copolymerized or bound in an amount of not more than 20 mol % with respect to the total amount of the dicarboxylic acid component and the oxycarboxylic acid component.

Moreover, this polyester includes a copolymerized polymer of a polycarboxylic acid or a polyhydroxy compound having 3 or more functional groups such as trimellitic acid, pentaerythritol in an amount of maintaining a substantially linear range, for example, in an amount of not more than 2 mol % of the total acidic component.

Other synthetic resins such as polyamides including Nylon 66 and Nylon 6 or halogen-containing polymers such as polyvinyl chloride can be applicable.

An amount of particles of the additive of the present invention to be added to the synthetic resin is not uniformly determined according to the use of the resin. In a case where the additive is used as an anti-blocking agent of the synthetic resin film, addition of 0.01–3 parts by weight with respect to 100 parts by weight of the synthetic resin film are appropriate, and 0.01–1 part by weight is the most preferable. The reason is that if the added amount is less than the lower limit, the anti-blocking effect cannot be fully exhibited due to the low addition ratio and the low accuracy for uniform dispersion in the synthetic resin. On the other hand, if the added amount is more than the upper limit, the transparency of the film is spoiled and the anti-blocking ability can not be improved in spite of a large amount of addition. Furthermore, the stretchability of the film becomes lower.

Methods for blending the additive particles of the present invention into the synthetic resin composition include a method of kneading particles into the synthetic resin by using a kneader. In a polyester such as PET, firstly the additive particles of the present invention is dispersed in ethylene glycol that is a raw material of the polyester, then the dispersion is added to the reaction mixture prior to an ester interexchange reaction or at a time between prior to an esterification reaction to prior to a polycondensation reaction.

The additive for synthetic resins of the present invention can be used with one or more other additives for synthetic resins, for example, polyolefins, polyesters and so on. Such additives include pigments, dyes, ultraviolet absorbers, many kinds of stabilizers, antioxidants, shading agents (for example, carbonblack, titanium oxide), processing aids, anti-static agents, anti-microbial agents, deodorants, agricultural medicines, perfumes, and so on, and these may be used singly or in combination of two or more. Since the additive for synthetic resins of the present invention has a high specific surface and a high percentage of voids, and has a superior absorbability and a retention activity, the above additives can be used by being adsorbed to or retained to the additive particles of the present invention.

For example, as the anti-microbial agent, inorganic anti-microbial agents such as silver, copper and zinc, quaternary ammonia such as benzalkonium chloride and cetylpyridinium chloride, alcohols such as ethanol and isopropanol, aldehydes such as formaldehyde and glyoxal, phenols such as cresol and xylenol, carboxylic acids such as sorbic acid and benzoic acid, guanidines such as chlorhexyzine and n-dodecylguanidine acetate, thiazoles such as 2-mercaptobenzothiazole, and 2-methyl-4-isothiazoline-3-one can be used. As the deodorant, tannic acid, camphor oil, and turpentine oil can be used. As the agricultural medicine, dimethyl phtalate, 2-ethyl-1,3-hexanediol, indalone, dimethyl carbate, irgabirine, PCP agent (pentachlorophenol), MEP agent (dimethyl thiophosphate) and ECP agents (diethyldichlorophenyl thiophosphate) can be used. As the ultraviolet absorber, 2,4-dihydroxybenzophenone, phenylsalicylate, 2-(2'-hydroxy-5'-methyl-phenyl)-benzotriazole and 2-ethylhexyl-2-cyano-3,3-diphenylacrylate can be used. As the dye, azo dye, anthraquinone dye, indigoid dye, sulfur dye and triphenylmethane dye can be used. As the perfume, natural perfumes such as musk, abies oil, bergamot oil, boroaze oil, rosewood oil, rosemary oil and orangeflower oil, synthetic perfumes such as ethyl acetoacetate, anethole, amylcinnamic aldehyde, ethyl isovalerate and isoamyl acetate and perfume mixtures including rose group, jasmine group, lilac group and so on can be used.

An amount of addition of these additives is not specifically limited. However, 0.0001–100% by weight with respect to the additive for synthetic resins of the present invention is preferable.

If necessary, another anti-blocking agents for example, inorganic particles such as synthetic spherical silica, β, γ-alumina, aulminosilicate, synthetic zeolite, titanium oxide, kaolin, cray, talc, barium sulfate, calcium phosphate and calcium carbonate and organic high molecular weight particles including silicone resin particles, cross-linked acrylic resins, polymethylmethacrylate particles, cross-linked polystyrene particles, cross-linked polyethylene particles, polyfluorocarbon particles and polyimide particles can be used with the additive of the present invention. An amount of these particles to be added is not specifically limited, however, usually, 0.01–3 parts by weight is preferable.

In order to increase the ability of dispersion and stabilization, the surface of the additive particle of the present invention can be treated, according to a conventional method, with coupling agents such as silane coupling agents and titanate coupling agents, surface treating agents including organic acids such as fatty acids, resin acids, acrylic acid, oxalic acid, citric acid and tartaric acid, inorganic acids such as hydrofluoric acid, polymers thereof, salts thereof or esters thereof and so on and dispersing agents such as surfactants.

Hereinafter, the present invention will be explained in greater detail by showing examples and comparative examples.

Methods for preparing aqueous suspension dispersion A1 and A2 that were used in Examples and Comparative examples, respectively:

<Calcium carbonate aqueous suspension dispersion A1>

Into 7,000 liters of lime milk (an aqueous suspension of calcium hydroxide) having a specific gravity of 1.055 and a temperature of 8° C., a furnace gas containing 27% by weight of carbon dioxide was introduced at a rate of 24 m$^3$. The carbonating reaction was performed until pH of the aqueous suspension became 9, followed by aging at 40°–50° C. for 5 hours with stirring. During the aging, alkali in the space of the particles was eluted out and the particles were dispersed at pH 10.8 thereby preparing an aqueous suspension dispersion A1 of calcium carbonate having an average particle diameter of 0.05 μm measured by a photograph of an electron microscope and an average particle diameter of 0.48 μm measured by a particle distribution tester SA-CP3 manufactured by Shimadzu Corp.

<Calcium carbonate aqueous suspension dispersion A2>

To heavy calcium carbonate "Super SSS" (1.2 m$^2$/g) made by Maruo Calcium Co., Ltd., water was added. After mixing, the calcium carbonate was stirred and dispersed using TK homomixer (5000 rpm, 15 min.) so as to prepare an aqueous suspension dispersion A2 of calcium carbonate having a solid concentration of 25% with an average particle diameter of 3 μm measured by a photograph of an electron microscopy and an average particle diameter of 3.4 μm measured by a particle distribution tester SA-CP3 manufactured by Shimadzu Corp.

Method for preparing a kaolin aqueous suspension dispersion B1 to be used in Examples.

To imported kaolin ASP-072, water was added. After mixing, the kaolin was stirred and dispersed using TK homomixer (5000 rpm, 15 min.) so as to prepare a kaolin aqueous suspension dispersion B1 with a solid concentration of 25%.

Method for preparing a calcium hydrogenphosphate.2H$_2$O aqueous suspension dispersion C1 and a calcium dihydrogen phosphate aqueous suspension dispersion C2.

<Calcium hydrogenphosphate.2H$_2$O aqueous suspension dispersion C1>

Calcium hydrogenphosphate.2H$_2$O manufactured by Taihei Kagaku Kogyo Co., Ltd. was crushed using an atomizer to adjust a particle size, followed by addition of water. After mixing, the suspension was stirred and dispersed using TK homomixer (5000 rpm, 15 min.) so as to prepare an aqueous suspension dispersion C1 of calcium hydrogenphosphate.2H$_2$O with a solid concentration of 25%. An average particle diameter measured by a particle distribution tester SA-CP3 manufactured by Shimadzu Corp. was 7.5 μm.

<Calcium dihydrogen phosphate aqueous suspension dispersion C2>

Calcium dihydrogen phosphate manufactured by Taihei Kagaku Kogyo Co., Ltd. was crushed using an atomizer to adjust a particle size, followed by addition of water. After mixing, the suspension was stirred and dispersed using TK homomixer (5000 rpm, 15 min.) so as to prepare an aqueous suspension dispersion C2 of calcium dihydrogen phosphate with a solid concentration of 25%. An average particle diameter measured by a particle distribution tester Shimazu SA-CP3 manufactured by Shimadzu Corp. was 8.2 μm.

EXAMPLES 1–8

A 0.4 m$^3$ stainless steel tank equipped with baffle plates and a stirrer with a turbine blade having a diameter of 0.6 m was used. Into this tank, raw materials listed in Table 1 and Table 2 were introduced and mixed according to mixing conditions described in Tables 1 and 2. A calcium carbonate aqueous suspension dispersion which was adjusted in concentration by dilution and temperature was introduced into the tank, then, under mixing conditions, one or more aqueous solutions or dispersions selected from the group consisting of a dilute aqueous solution of phosphoric acid, a calcium hydrogenphosphate.$2H_2O$ aqueous suspension dispersion and a calcium dihydrogen phosphate aqueous suspension dispersion were dropped into the tank, then aged under aging conditions listed in Tables 1 and 2 with stirring. After the aging was completed, the stirring was stopped. Then, a supernatant was removed by decantation and a resultant product was concentrated to a solid concentration of 8%, followed by spray drying. Thus, additive particles D1–D8 for synthetic resins whose substrates are calcium carbonate and whose surfaces are covered with petaloid hydroxyapatite were manufactured. From the X-ray diffraction analysis, only calcium carbonate (calcite) and hydroxyapatite were found out. The total amount of the raw materials and water was 400 kg.

Spray drying conditions were as follows: particle diameter when spraying: about 0.1 mm; temperature of hot air at the inlet: 250° C.; drying time: about 10 seconds; about 200° C.; and decrease of weight of the dried product immediately after drying when heated at 200° C. for 2 hours: 5–8%. Properties of the additive particles for synthetic resins prepared in Examples 1–8 were shown in Tables 3 and 4.

EXAMPLE 9

Into a 0.4 $m^3$ stainless steel tank equipped with baffle plates and a stirrer with a turbine blade having a diameter of 0.6 m, the kaolin aqueous suspension dispersion, diluted to a concentration of 8% and adjusted to a temperature of 35° C. was introduced. A 10% aqueous sodium hydrogenphosphate solution and a 5% aqueous calcium chloride solution were gradually dropped into the dispersion at a Ca/P atomic molar ratio being 1.67, aged at 35° C. for 24 hours to thereby deposite petaloid hydroxyapatite on the surface of the substrate, kaolin. After washing, the stirring was stopped and then a supernatant was removed by decantation and a resultant product was concentrated to a solid concentration of 8%, followed by spray drying, thereby obtaining an additive particle D9 for synthetic resins whose substrate is kaolin and whose surface is covered with petaloid hydroxyapatite. From the X-ray diffraction analysis, only kaolin (kaolinite) and hydroxyapatite were found out. The total amount of the raw materials and water was 400 kg. Spray drying conditions were the same as those of Example 1. Properties of the additive particle D9 for synthetic resins prepared in Example 9 are shown in Table 4.

TABLE 1

| Examples | 1 | 2 | 3 | 4 | 5 |
|---|---|---|---|---|---|
| Kind of calcium carbonate aqueous suspension dispersion | A 1 | A 1 | A 1 | A 1 | A 2 |
| Solid concentration of calcium carbonate aqueous suspension dispersion % | 8 | 8 | 8 | 8 | 8 |
| Solid concentration of dilute aqueous solution of phosphoric acid % | 5 | 5 | 5 | 5 | 5 |
| Ca/P atomic molar ratio | 1.86 | 1.86 | 2.57 | 5.58 | 16.76 |
| Mixing system: | | | | | |
| Time | 2.5 | 2.5 | 1.5 | 1.0 | 8 |
| Temperature of aqueous suspension °C. | 27 | 27 | 27 | 27 | 35 |
| PH of aqueous suspension | 5.5–6 | 6.5–7 | 6.5–7 | 6.5–7 | 6–6.5 |
| Circumferential speed of stirring blade m/sec | 1.0 | 6.0 | 6.0 | 6.0 | 3.0 |
| Aging system: | | | | | |
| Concentration of Ca % | 1.7 | 1.7 | 1.7 | 1.7 | 1.7 |
| Time | 48 | 12 | 12 | 12 | 12 |
| Temperature of aqueous suspension °C. | 27 | 27 | 27 | 27 | 35 |
| PH of aqueous suspension | 6.5–8 | 7.5–8 | 7.5–8 | 7.5–8 | 7–8 |
| Circumferential speed of stirring blade m/sec | 1.0 | 6.0 | 6.0 | 6.0 | 3.0 |

TABLE 2

| Examples | 6 | 7 | 8 |
|---|---|---|---|
| Kind of calcium carbonate aqueous suspension dispersion | A 1 | A 1 | A 1 |
| Solid concentration of calcium carbonate aqueous suspension dispersion % | 8 | 8 | 8 |
| Solid concentration of dilute aqueous solution of phosphoric acid % | | 5 | |
| Kind of calcium hydrogenphosphate.$2H_2O$ aqueous suspension dispersion | C 1 | C 1 | |
| Solid concentration of calcium hydrogenphosphate.$2H_2O$ aqueous suspension dispersion % | 5.5 | 5.5 | |
| Kind of calcium dihydrogen phosphate aqueous suspension dispersion | | | C 2 |
| Solid concentration of calcium dihydrogen phosphate aqueous suspension dispersion % | | | 5.5 |
| Ca/P atomic molar ratio | 1.86 | 1.86 | 1.86 |
| Mixing system: | | | |
| Time hr | 48 | 48 | 48 |
| Temperature of aqueous suspension °C. | 35 | 15 | 15 |
| PH of aqueous suspension | 6.5–6 | 7.5–7 | 7.5–7 |
| Circumferential speed of stirring blade m/sec. | 1.0 | 6.0 | 6.0 |
| Aging system: | | | |
| Concentration of Ca % | 1.7 | 1.7 | 1.7 |
| Time hr | 48 | 12 | 12 |
| Temperature of aqueous suspension °C. | 35 | 35 | 35 |
| PH of aqueous suspension | 7–7.5 | 7–8 | 7–8 |
| Circumferential speed of stirring blade m/sec. | 1.0 | 6.0 | 6.0 |

TABLE 3

| Examples | 1 | 2 | 3 | 4 | 5 | 6 | 7 |
|---|---|---|---|---|---|---|---|
| Particles *1 | D 1 | D 2 | D 3 | D 4 | D 5 | D 6 | D 7 |
| d × 1 μm | 6.8 | 1.6 | 1.5 | 1.0 | 4.0 | 8.5 | 1.6 |
| α | 1.3 | 1.0 | 1.3 | 1.5 | 1.4 | 1.8 | 1.1 |
| β | 0.9 | 0.6 | 0.8 | 0.9 | 1.3. | 1.3 | 0.9 |
| d × 2 μm | 0.02 | 0.02 | 0.02 | 0.02 | 0.03 | 0.02 | 0.02 |
| ω 1 | 96 | 96 | 95 | 93 | 91 | 93 | 97 |
| ω 2 | 83 | 84 | 75 | 69 | 62 | 82 | 87 |
| Sw 1 | 155 | 160 | 120 | 80 | 15 | 130 | 140 |
| 40/d × 1 | 6 | 25 | 27 | 40 | 10 | 5 | 25 |
| 100/d × 1 | 15 | 63 | 67 | 100 | 25 | 12 | 63 |
| HAP % (X-Ray) *2 | 90 | 90 | 65 | 30 | 10 | 90 | 90 |

*1 Additive particles corresponding to examples
*2 HAP: $Ca_5(PO_4)_3(OH)$, 9–4 3 2, hydroxapatite

TABLE 4

| Examples | 8 | 9 |
|---|---|---|
| Particles *1 | D 8 | D 9 |
| d × 1 μm | 1.5 | 1.2 |
| α | 1.0 | 1.5 |
| β | 0.7 | 1.7 |
| d × 2 μm | 0.02 | 0.02 |
| ω 1 | 96 | 92 |
| ω 2 | 83 | 67 |
| Sw 1 | 110 | 38 |
| 40/d × 1 | 27 | 33 |
| 100/d × 1 | 67 | 83 |
| HAP % (X-Ray) *2 | 90 | 10 |

COMPARATIVE EXAMPLE 1

An additive particle E1 for synthetic resins was prepared in the same manner as described in Example 1 except that the Ca/P atomic ratio was changed to 83.83 and mixing time was changed to 0.2 hour. The properties of E1 are shown in Table 5. From the X-ray diffraction analysis, only calcium carbonate (calcite) and hydroxyapatite were found out.

COMPARATIVE EXAMPLES 2

An additive particle E2 for synthetic resins was prepared in the same manner as described in Example 5 except that the Ca/P atomic ratio was changed to 83.83 and mixing time was changed to 0.2 hour. The properties of E2 are shown in Table 5.

From the X-ray diffraction analysis, only calcium carbonate (calcite) and hydroxyapatite were found out.

COMPARATIVE EXAMPLES 3

An additive particle E3 for synthetic resins was prepared in the same manner as described in Example 1 except that the calcium carbonate-aqueous suspension dispersion A1 was replaced by an aqueous suspension of an R-heavy calcium carbonate manufactured by Maruo Calcium Co., Ltd., having an average particle diameter of 15 μm measured by a particle distribution tester SA-CP3 manufactured by Shimadzu Corp. Properties of E5 are shown in Table 5.

From the X-ray diffraction analysis, octacalciumphosphate was found out, in addition to calcium carbonate (calcite) and hydroxyapatite.

TABLE 5

| Comparative examples | 1 | 2 | 3 |
|---|---|---|---|
| Particles *1 | E 1 | E 2 | E 3 |
| d × 1 μm | 0.1 | 3.5 | 23.0 |
| α | 38 | 1.8 | 1.8 |
| β | 3.0 | 1.4 | 1.4 |
| d × 2 μm | 0.02 | 0.03 | 0.4 |
| ω 1 | 88 | 83 | 83 |
| ω 2 | 54 | 44 | 44 |
| Sw 1 | 18 | 80 | 80 |
| 40/d × 1 | 400 | 11 | 2 |
| 100/d × 1 | 1000 | 29 | 4 |
| HAP % (X-Ray) *2 | 3 | 3 | 90 |

EXAMPLE 10–14 AND COMPARATIVE EXAMPLES 4–10

Additives for synthetic resins prepared in Examples 1,3, 5,6 and 9 and Comparative examples 1,2 and 3 and, as a control, commercially available A-type zeolite, kaolin cray and synthetic silica were used to prepare polypropylene compositions. From the compositions, biaxially oriented polypropylene films were obtained according to the method shown below, and the quality of the films were evaluated. The results are shown in Table 6.

Preparation of polyolefin films

To 100 parts by weight of polypropylene having a melt flow rate of 1.9 g/10 min., 0.10 part by weight of 2,6-di-t-butyl-p-cresol and 0.02 part by weight of Irganox 1010 (trade name of Chiba Geigy) as an antioxidant, 0.05 part by weight of calcium stearate as a hydrochloric acid catcher and an additive for synthetic resins of the present invention were added, mixed with Super mixer, and pelletized by an extruder.

The obtained pellets were formed into a sheet film by the use of an extruder and the obtained film was drawn 5 times to the longitudinal direction and 10 times to the lateral direction, and consequently, a stretched film of 30 μm thickness was obtained.

On one side of the stretched film thus obtained, corona discharge treatment was carried out.

The biaxially oriented film thus obtained was measured with respect to transparency, anti-blocking ability and anti-scratch ability. The transparency of the film was measured by using 4 sheets of films piled up according to ASTM-D-1003. The anti-blocking ability of the film was measured as follows: two sheets of films were piled one upon another so that the contacting area is 10 cm$^2$, the layered films were put between two glass plates, a 50 g/cm$^2$ load was added to the films and left for 7 days at 40° C., the layered films were pulled apart at a rate of 500 mm/min. by using Schopper tensile tester and the maximum load value was obtained. The anti-scratch test was done as follows: one biaxially oriented film was fixed on a glass plate, another biaxially oriented film was fixed on a box-type container having the contacting area of 50 cm$^2$, these two films were scratched by 6 times with a load of 4 kg, and a value of transparency was measured before and after scratching. The smaller the value becomes, the better the anti-scratch ability becomes.

TABLE 6

Additives for synthetic resins

| Examples | Particles | Amount parts by wt. | Quality of films Transparency % | Anti-blocking g/10 cm² | Anti-scratch |
|---|---|---|---|---|---|
| Example 10 | D 1 | 0.04 | 4.8 | 40 | 1.9 |
| Example 11 | D 3 | 0.08 | 9.4 | 20 | 3.4 |
| Example 12 | D 5 | 0.06 | 6.7 | 40 | 4.6 |
| Example 13 | D 6 | 0.04 | 5.1 | 50 | 4.2 |
| Example 14 | D 9 | 0.08 | 10.1 | 20 | 5.9 |
| Comp.ex.4 | E 1 | 0.04 | 9.2 | 1200 | 6.2 |
| Comp.ex.5 | E 2 | 0.04 | 8.4 | 950 | 6.5 |
| Comp.ex.6 | E 3 | 0.04 | 11.0 | 420 | 10.5 |
| Comp.ex.7 | A-type zeolite | 0.08 | 14.6 | 120 | 6.7 |
| Comp.ex.8 | Synthetic silica | 0.15 | 13.7 | 1050 | 5.1 |
| Comp.ex.9 | Kaolin cray | 0.15 | 19.8 | 650 | 10.1 |
| Comp.ex.10 | Blank | — | 2.0 | 2400 | 1.0 |

EXAMPLE 15–18 AND COMPARATIVE EXAMPLES 11–14

Ethylene glycol slurries of additives for synthetic resins prepared in the above Examples 2,4,7 and 8, Comparative examples 1 and 2 and, as a control, commercially available A-type zeolite and synthetic spherical silica were added prior to a polyesterification, followed by a polyesterification reaction, to thus obtain polyethyleneterephthalates containing 0.1% by weight of the particles and having a limiting viscosity number (orthochlorophenol, 35° C.) of 0. 62 dl/g. The polyethyleneterephthalates were dried at 160° C. , followed by a melt extrusion at 290° C., rapidly cooled and solidified on a casting drum having a temperature maintained at 40° C., thereby obtaining unstretched films. The thus obtained unstretched films were pre-heated at 70° C. by a heating roller, stretched 3.6 times to the longitudinal direction while heating with an infrared heater, and then stretched 4 times to the lateral direction at 90° C., followed by heat treatment at 200° C. Thus, biaxially oriented films having a thickness of 15 μm were obtained.

The quality of the thus obtained films was evaluated according to the following methods. The results are shown in Tables 7 and 8.

① Surface roughness of the film(Ra)

The surface roughness of the film is a value defined as a center line average height (Ra) of JIS-B0601. In the present invention, a tracer type surface roughness tester of Kosaka kenkyusho Co., Ltd., (SURFCORDER SF-30C) was used to measure the center line average height. Measuring conditions are as follows:

(a) radius of a head of the tracer: 2 μm, (b) measuring pressure: 30 mg, (c) cut off: 0.25 mm, (d) length for measurement: 0.5 mm, and (e) an average value is calculated from 4 data obtained by excluding the highest value from 5 repeated values on the same sample.

② Friction coefficient of the film (μk)

Figure 1:
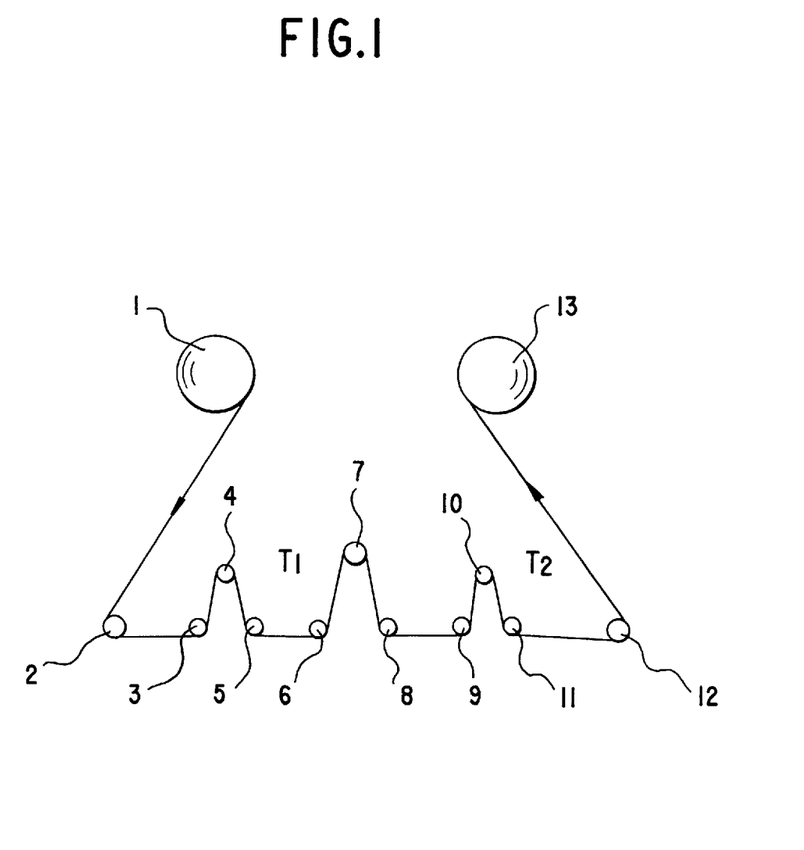
FIG. 1 is a shematic respresentation of an apparatus for measuring a friction coefficient of a film.

The friction coefficient is measured by using an apparatus shown in FIG. 1. In FIG. 1, each number shows parts of the apparatus, respectively, as follows: 1: unwinding reel; 2: tension controller; 3,5,6,8,9 and 11: free roller; 4: tension detector (inlet); 7: fixing bar (outer diameter:5 mm) made of stainless steel net, SUS304; 10: tension detector (outlet); 12: guide roller; and 13: winding reel.

Under conditions of a temperature of 20° C. and a humidity of 60%, a cutted film of ½ inch width was contacted with the fixing bar 7 (surface roughness: 0.3 μm) at an angle of $\theta=(152/180)\pi$ radian (152°) and moved (frictioned) at a rate of 200 cm per min. When the tension controller is adjusted so that the inlet tention T1 is 35 g, the outlet tention (T2:g) is detected by the outlet tension detector after 90 meter run of the film. The traveling friction coefficient μk is calculated from the following equation:

$$\mu k=(2.303/\theta) \log (T2/T1)=0.86 \log (T2/35)$$

③ Evaluation of abrasion-I

A surface of the film of ½ inch width is contacted with a stainless steel fixing pin (surface roughness 0.58 μm) having a diameter 5 mm at an angle of 150°, and the fixing pin is moved and frictioned reciprocally about 15 cm intervals at a rate of 2 meters per minute. In this case, the inlet tension T1 is 60 g.

The above operations are repeated, and after 40 reciprocal movements, degree of scratches raised on the surface of the film is visually examined. The four-rank evaluation of the scratches is made according to the criteria: A: scratches are scarcely found; B: a few scratches are found; D: scratches are found all over the surface; and C: intemediate of B and D.

④ Evaluation of abrasion-II

Shavingness of the running surface of the film is evaluated by using a 5 layered minisuper calender. The calendar is 5 layered of nylon rolls and steel rolls. A treatment temperature is 80° C. and a linear load on the film is 200 kg/cm. A film speed is 50 meters/min. After running film 4000 meters in total, the shavingness of the film is evaluated by smudge adhered to the top roll of the calender.

<Four-ranks evaluation>

A: no smudge on the roll

B: little smudge on the roll

C: smudge on the roll; and

D: noticeable smudge on the roll.

⑤ Number of coarse protrusions on the film surface

After aluminum is thinly vapor deposited on the film surface, the number of coarse protrosions with 4 or more quartet circles (number per 1 mm² of the measuring area) is counted by using a binary beam interference microscope, and ranked according to the number of the coarse protrusions:

1st class: not less than 16; 2nd class: 12–15;
3rd class: 8–11; 4th class: 4–7; and
5th class: 0–3

TABLE 7

| Examples | 1 5 | 1 6 | 1 7 | 1 8 |
|---|---|---|---|---|
| Particles | D 2 | D 4 | D 7 | D 8 |
| Surface roughness Ra μm | 0.021 | 0.020 | 0.022 | 0.021 |
| Friction coefficient μk | 0.38 | 0.40 | 0.38 | 0.38 |
| Abrasion-I | A | B | A | A |
| Abrasion-II | A | B | A | A |
| Coarse protrusions | 5th class | 5th ciass | 5th class | 5th class |

TABLE 8

| Comp. examples | 11 | 12 | 13 | 14 |
|---|---|---|---|---|
| Particles | E 1 | E 2 | A-type Zeolite 1.5 μm | Spherical Silica 1.5 μm |
| Surface roughness Ra μm | 0.025 | 0.029 | 0.022 | 0.020 |
| Friction coefficient μk | 0.37 | 0.38 | 0.38 | 0.38 |
| Abrasion-I | D | D | D | C |
| Abrasion-II | C | C | D | C |
| Coarse protrusions | 2nd class | 3rd class | 1st class | 4th class |

The following Examples and Comparative examples are cases where the additive for synthetic resins are allowed to adsorb a perfume or deodorant, and then blended with a synthetic resin.

EXAMPLES 19 AND 20, COMPARATIVE EXAMPLES 15–18

Each 5 grams of the additive particles D3 and D4 which were prepared in Examples 3 and 4, the A-type zeolite and the synthetic spherical silica used in Comparative examples 13 and 14, and commercially available calcium silicate and alumina were used as a carrier and immersed in a perfume (ethyl acetoacetate) for two hours, thereby obtaining the additives for synthetic resins carrying the perfume. Using the obtained additives for synthetic resins, 20 parts by weight of the additives resins were used to prepare polyvinyl chloride sheets of 2 mm thickness. To evaluate the retention ability of the perfume of the sheets, the sheets were left in the room with room temperature and the retention ability was measured. The results are shown in Table 9.

EXAMPLES 21 AND 22, COMPARATIVE EXAMPLES 19–22

Each 10 grams of the additive particles D3 and D4 which were prepared in Examples 3 and 4, the A-type zeolite and synthetic spherical silica used in Comparative examples 13 and 14, and commercially available alumina and barium sulfate was spray added with 5 grams of a 40% aqueous solution of a deodorant (tannic acid), thereby obtaining additives for synthetic resins to which 2 grams of tannic acid were adsorbed. Each of the additives was used to prepare polyester fibers, according to the following method:

As raw materials, dimethyl terephthalate and ethylene glycol were used. Each of the thus obtained additive was added to the materials in an amount of 3% by weight with respect to the weight of a polyester to be produced, followed by conventional polymerization reaction, thereby obtaining a polyethyleneterephthalate in a chip form. The dispersibility of the additive in the polyester was good. The polyester was supplied to an extrusion molding machine and spinned at 290° C. to obtain an unstretched fiber. The thus obtained unstretched fiber was stretched 3 times by two-step stretching in 75° C. water bath and 96° C. water bath, thereby obtaining a stretched fiber.

For evaluating the deodorizing ability of the fibers, a scrubbing bottle (volume of 3000 ml) containing 150 ml of a 10% aqueous ammonium solution and having a column packed with the fibers at its outlet was prepared. From an inlet, nitrogen gas was flowed at a rate of 500 ml/min., and the ammonium gas that has passed through the column was introduced into an aqueous hydrochloric acid solution of pH 4. The deodorizing ability was evaluated as a time required for the pH of the solution becoming 10 or more where ammonium was no more adsorbed by the fibers. The results are shown in Table 10.

TABLE 9

| | Particles | 2 weeks | 4 weeks | 6 weeks | 8 weeks | 12 weeks |
|---|---|---|---|---|---|---|
| Example 19 | D 3 | A | A~B | A~B | B | B |
| Example 20 | D 4 | A | A~B | B | B | B~C |
| Comp.ex 15 | Synthetic zeolite | A | A~B | B | C | C~D |
| Comp.ex 16 | Synthetic silica | A~B | A~B | B | C | C~D |
| Comp.ex 17 | Calcium silicate | A | A~B | B | C | C~D |
| Comp.ex 18 | Alumina | A~B | A~B | B | C | C~D |

(Evaluation ctiteria)
A: Fragrance was scarcely decreased.
B: Fragrance was slightly decreased.
C: Fragrance was decreased to half.
D: Fragrance was scarcely noticed.

TABLE 10

| | Corrier particle | Adsorbing time required until pH 10 or more (min) | Adsorbing ability |
|---|---|---|---|
| Example 21 | D 3 | 2 5 | good |
| Example 22 | D 4 | 2 3 | good |
| Comp.ex 19 | Synthetic silica | 1 7 | normal |
| Comp.ex 20 | Synthetic zeolite | 1 4 | normal |
| Comp.ex 21 | Alumina | 1 6 | normal |
| Comp.ex 22 | Barium sulfate | 1 5 | normal |

Industrial Applicability

As stated above, by using an additive for synthetic resins of the present invention, a synthetic resin composition having good properties can be prepared. For example, when the additive is used in a polyolefin film, the polyolefin film having good anti-blocking ability, good transparency and good anti-scratch ability can be obtained. Moreover, when the additive is used in a polyester film, a good polyester film having good slipperiness, good anti-abrasion and less coarse protrusions can be obtained.

We claim:
1. A synthetic resin composition which contains particles which are surface-coated with petaloid porous hydroxyapatite having a chemical formula $Ca_5(PO_4)_3(OH)$, the petaloid porous hydroxyapatite being contained in the particles in a ratio of not less than 5% by weight of the particles, and the particles satisfying the following formulas (a)–(d):

$$0.1 \leq dx1 \leq 20 (\mu m) \qquad (a)$$

$$1 \leq \alpha \leq 2, \text{ where } \alpha = d50/dx1 \qquad (b)$$

$$0 \leq \beta \leq 1.7, \text{ where } \beta = (d90-d10)/d50, \text{ and} \qquad (c)$$

$$40/dx1 \leq Sw1 \leq 400 \qquad (d)$$

wherein,
- dx1: Average particle diameter ($\mu$m) measured by a photograph of an electron microscope;
- $\alpha$: Dispersion coefficient;
- d50: 50% average particle diameter ($\mu$m) measured by a particle size distribution tester using a microtrack FRA laser;
- $\beta$: Sharpness; a particle size distribution value; the smaller the value becomes, the sharper the distribution becomes;
- d90: 90% particle diameter of the total particles passed through a sieve measured by a particle size distribution tester using a microtrack FRA laser;
- d10: 10% particle diameter of the total particles passed through a sieve measured by a particle size distribution tester using a microtrack FRA laser;
- Sw1: BET specific surface m$^2$/g by a nitrogen adsorbing method.

2. The synthetic resin composition of claim 1, wherein the particles have the average particle diameter dx1 satisfying the following formula (e):

$$0.1 \leq dx1 \leq 10 (\mu m). \qquad (e)$$

3. The synthetic resin composition of claim 1, wherein the particles have the average particle diameter dx1 satisfying the following formula (f):

$$0.5 \leq dx1 \leq 8 (\mu m). \qquad (f)$$

4. The synthetic resin composition of claim 1, wherein the particles have the dispersion coefficient $\alpha$ and the sharpness $\beta$ both satisfying the following formulas (g) and (h), respectively:

$$1 \leq \alpha \leq 1.5, \text{ and} \qquad (g)$$

$$0 \leq \beta \leq 1.0. \qquad (h)$$

5. The synthetic resin composition of claim 1, wherein the particles have the BET specific surface Sw1 satisfying the following formula (i):

$$100/dx1 \leq Sw1 \leq 350. \qquad (i)$$

6. The synthetic resin composition of claim 1, wherein the particles satisfy the following formulas (j)–(l):

$$0.01 \leq dx2 \leq 1 (\mu m), \qquad (j)$$

$$90 \leq \omega 1 \leq 99, \text{ and} \qquad (k)$$

$$60 \leq \omega 2 \leq 95, \qquad (l)$$

wherein,
- dx2: Average micropore diameter ($\mu$m) of particles measured from a distribution of the micropore measured by a mercury penetration method;
- $\omega$1: Static percentage of voids (%) calculated from the following equation (m):

$$\omega 1 = \left\{ 1 - \frac{1}{2.9 \times [\text{apparent specific volume}]} \right\} \times 100 (\%) \qquad (m)$$

wherein the apparent specific volume (ml/g) is measured according to a static method of pigment test of JIS K5101-91 20.1;
- $\omega$2: Pressurized percentage of voids (%) calculated from the following equation (n):

$$\omega 2 = \left\{ 1 - \frac{0.5}{2.9 \times 2 \times [\text{thickness}]} \right\} \times 100 (\%) \qquad (n)$$

wherein the thickness is measured by a slide calipers after packing 0.5 g of a sample in a cylinder having a section of 2 cm$^2$, pressurizing the sample with a pressure of 30 kg/cm$^2$ for 30 seconds.

7. The synthetic resin composition of claim 1, wherein the particles satisfy following formulas (o) and (p);

$$95 \leq \omega 1 \leq 99, \text{ and} \qquad (o)$$

$$70 \leq \omega 2 \leq 95. \qquad (p)$$

8. The synthetic resin composition of claim 1, wherein the weight of the petaloid porous hydroxyapatite with respect to the particle weight is not less than 25% by weight.

9. The synthetic resin composition of claim 1, wherein the weight of the petaloid porous hydroxyapatite with respect to the particle weight is not less than 50% by weight.

10. The synthetic resin composition of claim 1, wherein the weight of the petaloid porous hydroxyapatite with respect to the particle weight is not less than 90% by weight.

11. The synthetic resin composition of claim 1, wherein the synthetic resin composition is a synthetic resin fiber or a synthetic resin film.

* * * * *